3,206,467
METHOD OF PREPARING THIOETHERS
Walter Reifschneider, Midland, Mich., assignor to The Dow Chemical Company, Midland, Mich., a corporation of Delaware
No Drawing. Filed June 27, 1962, Ser. No. 205,516
3 Claims. (Cl. 260—302)

The present invention is directed to a novel method for the preparation of thioethers, and to certain thioethers prepared thereby.

According to the present invention I have discovered a novel general method for the preparation of thioethers which permits the synthesis of thioethers of very wide variety including many thioethers hitherto unknown and impossible to synthesize. Among the kinds of thioethers to be prepared in the new method are polythioethers, and polyethers comprising a plurality of recurring chalkogen linkages whereof certain desired members are sulfur; and substituted derivatives of such compounds.

The novel method of the present invention may be represented schematically as follows:

$$R-SH + X-R' \xrightarrow[\Delta]{Cu^+ N^+} RSR' + HX$$

wherein R and R' are organic groups, X is a halogen, Cu+ is a source of cuprous ions and N+ represents a nitrogenous base. Thus, the present general method for the synthesis of thioethers may be described as a method which comprises causing a reaction between a mercaptan and an organic halide in the presence of both a nitrogenous base and a source of cuprous ions. It will at once be apparent to skilled chemists that by the choice of mercaptans containing a plurality of sulfhydryl groups and the subsequent employment of poly-halogenated compounds, the method of the present invention permits the synthesis of polymers wherein recurring organic groups such as aliphatic or aromatic groups are bonded together by intervening divalent sulfur atoms. Similar polymers are prepared from the employment of mercaptans containing also halogens, whereof the halogen provides a reactive site at which the sulfhydryl group can, by reaction, set up a thioether linkage. Polymers of relatively low molecular weight are produced in good yield in this way.

Various novel thioethers including polymeric thioethers newly prepared by the present novel method are also comprehended within the present invention.

It is known to react alkali metal mercaptides of a very limited range with lower alkyl or, rarely, aryl halides in inert reaction medium. This method has been limited to aryl halides in which the halogen substituent has been activated by the presence on the aryl nucleus of electron-withdrawing groups, such as nitro groups, and they in ortho or para positions to the halogen. By this method it is possible to produce a few thioethers. However, prior to the present method it has been impossible to prepare such relatively simple thioether compounds as

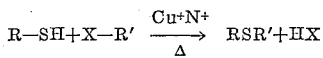

or

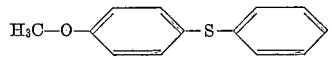

in one step and in good yield. Now I have discovered that almost any mercaptan, which may be an alkyl, cycloalkyl, heterocyclic or aryl mercaptan, and almost any organic halide, which may be an aromatic, heterocyclic, alicyclic or aliphatic halide, either starting material being of any molecular weight, may be contacted together in the presence of a nitrogenous base and a cuprous compound, the resulting reaction mixture heated to a reaction temperature whereupon there is prepared, in a single process, a thioether compound comprising organic moieties derived from the mercaptan and from the organic halide. The only limit upon the starting materials is that they be relatively stable under reaction conditions and that they be relatively not seriously hindered by steric relationships of substituents. The method does not produce desired compounds efficiently when starting material or product is, or becomes, unstable before reacting. The reaction releases the elements of hydrogen halide.

In one embodiment of my invention, copper in any convenient form is employed instead of, or as a source of cuprous ions. In such embodiment, the copper source, which may be metallic copper, copper oxide or hydroxide, and the like, reacts in some way to become an effective cuprous catalytic substance. Thus while I believe cuprous ions to be part of the active catalytic agent in some kind of cooperation with the nitrogenous base, the copper may be added to the reaction mixture in any convenient form which is capable of reacting, in such mixture, to obtain a cuprous compound. When desired, the copper may be added as cuprous compound, for example, cuprous chloride, in the first instance.

In carrying out the preparation of the thioethers according to the novel method of the present invention, an appropriate mercaptan, copper catalytic substance or precursor thereof, a liquid reaction medium, and a nitrogenous base are combined to obtain a reaction mixture. The metal salt of a mercaptan may be employed when desired, instead of the free mercaptan. Such salt may offer the advantage of being easier to work with. The reaction medium may be an inert liquid reaction medium such as benzene, toluene, a lower alkanol or a lower alkyl ether, or the like; when an inert liquid reaction medium is employed the necessary nitrogenous base is added thereto. Such nitrogenous base may be, for example, a primary, secondary, or tertiary lower alkyl amine, or a lower alkanol amine, or the amine requirement may be met by the presence, as substituent upon one or more of the reactants to be employed, of an amine group. If desired, both nitrogenous catalyst and reaction medium requirements may be met by employment of an amine-type liquid reaction medium such as pyridine, lutidine, picoline, aniline, dimethylaniline, xylidine, N,N-dialkylxylidine or an aromatic or aliphatic amine chosen as being liquid under the reaction conditions. Such amine-type liquid may be employed alone, or may be employed as part of a liquid medium of which other parts are inert liquids. In another manner of practicing the present invention, the catalytic amine compound requirements may be met by the employment, in the reaction mixture, of ammonia, or source of ammonia or of am-

monium ion, as supplied by the presence of an ammonium compound.

Thus, copper compounds which may be used and are effective as sources of cuprous ions or precursors thereof in practicing the present invention, include copper acetate, basic copper acetate, copper benzoate, copper metaborate, cuprous bromide, cupric bromide, cupric butyrate, cuprous carbonate, basic cuprous carbonate, cupric chloride, cuprous chloride, cupric ethylacetoacetate, cupric fluoride, cupric formate, cuprous formate, cuprous hydroxide, cupric hydroxide, cuprous iodide, cupric lactate, cupric laurate, cupric oleate, cupric oxalate, cuprous suboxide, cupric palmitate, cupric orthophosphate, cupric salicylate, cupric stearate, cuprous sulfate, cupric sulfate, cuprous sulfite, cupric tartrate, diammine copper acetate, tetrammine copper sulfate. Copper compounds which act as oxidizing agents are usually first reduced by oxidation of mercaptan and would thus be moderately wasteful of mercaptan, but are nonetheless successful when this is allowed for. Such substances include copper bromate, copper chlorate, cupric dichromate, cupric iodate, cupric nitrate, basic cupric nitrate, cupric oxychloride, and the like. In these and any of a great many similar and related forms, copper is successfully employed, in the present reaction, either as a direct source of cuprous ions or as a source of copper which, by reacting in the present mixture, gives rise to cuprous ions. Cupric compounds are readily converted to cuprous compounds when employing the stated conditions, although their use may be wasteful of mercaptan reactant.

At least in laboratory procedures, it is convenient to employ a liquid compound of the pyridine type such as the picolines, lutidines, collidines, and quinolines as solvents. The nitrogenous base may be a solid at room temperature and, in use, may be either dissolved or melted.

The reaction employs as starting materials organic halides which, in the presence of an excess of harsh basic substances such as alkali metal hydroxides, tend to decompose forming alkali metal halides and various organic decomposition products. Thus if alkali metal compound is used as part or all of the hydrogen halide inactivating substances, the materials should be used in amounts not much greater than an amount equimolecular with employed mercaptan.

When the reaction employing a mercaptan goes forward with formation of hydrogen halide or at least the elements of hydrogen halide, such hydrogen halide or the elements thereof tend to react with halide accepting substance which may include the nitrogenous basic catalytic substance. Subsequent to such reaction, the resulting nitrogenous material is no longer basic and its catalytic effectiveness is in some way lost. Therefore, it is essential and critical that the nitrogenous basic catalytic material (which may be a mixture of various nitrogenous basic substances, chosen for such considerations as cost, boiling temperature, and the like) be supplied in a total amount at least slightly greater than that equimolecular with hydrogen halide to be evolved in the course of the reaction, or than that not otherwise inactivated.

In a minor and obvious variation of the present method the mercaptan may first be reacted (in the reaction mixture wherein other steps of the present method are subsequently to be employed, if desired) with a basic alkali metal compound to prepare the alkali metal mercaptide; this substance is subsequently employed in the manner indicated for the general method. When this method is used, alkali metal halide is formed and, while it has no tendency to consume basic nitrogenous catalytic substance, may require filtration, aqueous extraction, or the like to remove salt by-product from the resulting product mixture.

Although the nitrogenous basic substance is consumed in certain indicated procedures for carrying out the present method, it may, in the instance of many such substances be regenerated or reconstituted into its original, catalytically useful form by means no more difficult than steam distillation in the presence of such cheap basic material as slaked lime, or limestone.

When liquid nitrogenous base is employed as liquid reaction medium the employed amount is usually entirely sufficient, otherwise, an inert liquid reaction medium may be employed together with sufficient nitrogeneous base for catalysis and hydrogen halide acceptance, in the manner described.

It is thus apparent that the nitrogeneous base compounds to be employed as a component in the catalyst system of the method of the present invention include monomethylamine, dimethylamine, trimethylamine; monoethylamine, diethylamine, triethylamine; mono-n-propylamine, di-n-propylamine, tri-n-propylamine. Those which are gases or volatile liquids are employed under pressure or in solvent solution or are continuously supplied Other useful compounds include monoisopropylamine, diisopropylamine, triisopropylamine; mono - n - butylamine, di-n-butylamine, tri-n-butylamine; N,N-dimethyl-N-tertiarybutylamine; cyclohexylamine; the various aliphatic amines of low to intermediate molecular weight, characteristically of mixed isomeric structure, available commercially under the trademark "Armeen"; nitrogenous compounds and nitrogeneous bases including aliphatic and aromatic heterocyclic nitrogen compounds, and substituted compounds containing, for example, one or more aromatic groups such as aniline, N-methylaniline, and similar basic derivatives of aniline. Also, the amino alcohols such as the alkanolamines are effective nitrogenous base catalytic materials. For example, monoethanolamine, diethanolamine, triethanolamine, the propanolamines and isopropanolamines, and other alkanolamines which have useful physical properties are satisfactorily employed.

The employed amounts of either the nitrogenous base component or the cuprous component of the composite catalyst to be employed in the present invention is not critical so long as both in fact, are and remain present. In general, when amounts less than 1 mole percent of catalyst are employed, the reaction goes forward more slowly than when moderately larger amounts are employed. On the other hand, when as much as 5 molar percent is employed, the reaction goes forward at a good rate. The employment of a larger amount of either or preferably both catalyst components is usually attended by increasing benefits in proportion to the amount of catalyst employed, up to an amount about equimolecular with limiting starting reactant. As has been noted, due allowance is to be made for the consumption of nitrogenous base by reaction with hydrogen halide.

The reaction of the present method is somewhat temperature dependent. At a temperature lower than a preferred reaction temperature, the reaction of the mercaptan compound (free mercaptan or salt such as alkali metal salt), and the organic halide usually goes forward, but at a rate so slow as to be relatively inefficient. When the reaction mixture is heated to a reaction temperature, the reaction takes place promptly and goes to completion without undue delay. A preferred reaction temperature is a temperature in the range of from about 60° to about 250° C. In general, the lowest efficient reaction temperature or the reflux temperature of solvent, is to be preferred.

Although, as has been stated, successful procedures in which to prepare the present products are somewhat temperature dependent, it is not necessary to know, in advance, the precise temperature at which a reaction will take place. Ordinary heating means of laboratory or industrial type are adequate and any of a wide range of liquid reaction media may be employed. The conditions are met for the preparation of aromatic thioether products of an extremely wide variety by employment of quinoline or a substituted quinoline compound which boils stably and has a relatively high boiling temperature, as reaction medium. For the preparation of almost all aliphatic thioether compounds, 2,4-lutidine is a satisfactory nitrogenous base and reaction medium. However, when it is desired to do so, other nitrogenous base compounds of the sort previously described may be employed with good results.

Under ordinary conditions of carrying out the present reaction, some of the substances employed, or present as transitory intermediates, may be relatively susceptible of undesired oxidation. This oxidation may be prevented by the provision of an inert atmosphere which may be a moving current or an unmoving atmosphere of an inert gas such as nitrogen, helium, vapor of reaction medium or of nitrogenous base substance or the like. While such provision will commonly increase the efficiency of the method, good results are had without any control of the atmosphere adjacent the reaction.

When it is desired to carry out the preparation of a thioether according to the novel method, a reaction mixture is prepared, comprising organic halide, mercaptan, nitrogenous base, and source of cuprous ions. The components may be combined in any order. The addition of organic halide to the said mixture may be carried out in the initial preparation of a reaction mixture. Alternatively, the organic halide may be added at any subsequent time, such as at the time that the reaction mixture, or a mixture of some of the components thereof, has been heated to a reaction temperature, or at other times.

When carrying out a reaction according to the present method between, on the one hand, a polyhalo compound and on the other hand a polymercapto compound, various courses of reaction are possible. When the employed groups have spatial relationships which permit of multiple reaction giving rise to ring closure, and when it is desired to prepare the product resulting from such polythioether ring closure, the polyhalo and polymercapto compounds are reacted together according to the present method using a relatively large amount of solvent liquid whereby the concentration of the reacting substances is low. Low to medium reaction temperautres are indicated also. When between the same reacting substances it is desired to cause the reaction whereby to prepare a relatively linear polythioether polymer, then the reaction is advantageously carried out at substantially higher temperatures, such as those achieved under superatmospheric pressure, with the reactants in relatively high concentration. The same considerations apply when employing a halogenated mercaptan such as

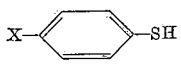

or

X–R–SH to prepare, variously, linear polymers or low polymers with ring closure.

When it is desired to carry out a reaction between a polyhalo compound on one hand and on the other hand a polymercapto compound whereby only one mercapto group reacts with only one halogenated site giving rise to a thioether compound upon which there remain unreacted halogen and unreacted mercapto groups, the reactants are employed together in approximately stoichiometric amounts, the reaction conditions, notably duration of the reaction and reaction temperature, are maintained at values near to the lower values advantageously employed in the present method. In this situation, the resulting reaction mixture usually contains all possible products of reaction from which the desired product is readily separated as by recrystallization, vacuum distillation and the like.

Although the present method depends upon the reaction of an oragnic halide and a mercaptan, it is possible and convenient so to carry out the reaction as to leave unreacted halogen of desired identity in any position upon the resulting thioether compound. Thus, for example, when it is desired to prepare a thioether of which one representative moiety or group is a cyclic group upon which cyclic group it is desired that, for example, bromine appear as a substituent, the desired compound is prepared by causing a reaction according to the present method between a mercaptan and a dibromo compound of which one bromine is in the position whereupon bromine is to appear in the resulting product. The mercaptan is employed in a stoichiometric amount. As the reaction goes forward, all the various possible reaction products are prepared and at first exist together in the resulting reaction mixture. Thereafter, the said mixture is resolved into its various components in such known methods as distillation, recrystallization from solvent, and the like.

When it is desired, according to the method of the present invention, to prepare a thioether compound upon which, as substituent, there appears an unreacted halogen of the sort adapted to be employed in the reaction of the present method, advantage may be taken of the fact that reactivities of halogens in the method of the present invention vary approximately directly as molecular weight. Thus, for example, when it is desired to prepare a thioether in the manner of the present invention upon one or more moieties or groups of which it is desired to have, for example, bromine, it is convenient to begin with a starting halo-oragnic compound upon which, for reaction in the present process, iodine appears as reactive halogen substituent and bromine appears in a position relative to the position of the iodine in which it is desired that the bromine appear relative to the position of the thioether linkage in the completed compound. In this situation, when employing stoichiometric amounts of the reacting substances, the reaction of the present invention will almost completely preferentially go forward with the displacement of iodine leaving the brominated site almost completely unattacked.

Similarly, when it is desired that chlorine appear on the thioether prepared in the manner of the present invention, a chlorobrominated starting haloorganic compound may be employed and the brominated site will participate in the reaction of the present invention to the almost complete exclusion of the chlorinated site when equimolecular amounts of the reactants are employed.

Fluorine is both more expensive and more difficult to cause to participate in the reaction of the novel method; thus the use of starting haloorganic compounds whereof the halogen X is fluorine is not usually preferred. However, fluoroorganic compounds do take part in the reaction of the present method and may be employed if desired.

In one embodiment of the novel method of preparing the thioether, which, by reason of its economy and simplicity is a preferred method, the mercaptan, organic halide, nitrogenous base, and cuprous material such as cuprous oxide are combined in the initial reaction mixture, the cuprous material being employed in a catalytic amount, such as from 1 to 125.0 mole percent by weight of employed sulfhydryl sulfur. Alternatively, the catalytic amount of copper compound may be added to the reaction mixture as metallic copper or as a copper halide. Whatever form of copper compound is employed, it should preferably be added to the reaction mixture in finely divided form; or, if soluble in the liquid reaction medium, it may be added as a liquid.

Because of the extreme versatility of the present method, the desired thioether compounds may vary from colorless, mobile liquids to tars or dark, crystalline solids. They may or may not be soluble in the reaction mixture. Skilled chemists, with the present teaching will be able to prepare the thioether products and will be able to separate products from reaction mixture and purify the products by such methods as filtration, decantation, centrifuging, and in other known methods.

Methods which have been quite broadly useful commonly employ, as a first step, the removal of the nitrogenous base catalyst material, commonly by reacting it with excess hydrochloric acid in the presence of ice whereby to avoid producing undesired high temperatures of reaction. Alternatively, the separation from the nitrogenous base has often been successfully carried out by steam distillation whereby components of the distilled mixture are separated according to their relative volatilities; depending upon the nature of the thioether and nitrogenous base, a good separation is usually possible in this method when the temperatures of steam distillation are not injurious. As a further advantage, this method brings over any substances which form azeotropes with water vapor.

Another useful technique of which skilled chemists are universally aware is the extraction of product from the neutralized reaction mixture with extractive solvent such as diethyl ether, benzene, dichloromethane, chloroform, or the like.

When it is desired to remove traces of the cuprous catalytic substance, and when distillation or other steps which would effect such removal are not available or have not succeeded, the mixture may be extracted with strong aqueous ammonia or with hydrochloric acid. The former forms copper-ammonium complexes which are water-soluble whereas most of the desired products of the method are not; the latter forms, of course, chlorides which are relatively soluble. Subsequent to such extractions, the product may be recrystallized from solvent.

Little or none of the product substances of the present invention is sorbed on activated charcoal. This material, however, tends to sorb and remove numerous impurities. Thus it may be used to decolorize and purify solvent solutions of the present products.

With the foregoing exemplary procedures, skilled chemists will encounter no undue difficulty in separating and purifying the products of the present method.

The novel thioethers including, particularly, certain of the novel polymeric thioethers of the present invention, are especially useful to be employed as lubricants and lubricant adjuvants under particular conditions of extreme pressure and elevated temperature. While the use of sulfur-containing compounds as lubricant additives is old in the art, these compounds have often suffered from the disadvantage of an undesired temperature dependence. In numerous applications to mechanical devices of the present day, lubricants must perform well under severe conditions of pressure, shear, and at temperatures high enough to damage many lubricant additives. Thermal damage to sulfur-containing lubricant additives is particularly to be avoided, because some of the pyrolytic or oxidative products resulting from such damage may be compounds which are relatively reactive with the surfaces, notably metallic surfaces, of which the lubrication one from the other is desired, with the result that the breakdown of the lubricant additive greatly accelerates the occurrence of damage to the surfaces thus lubricated. Under such conditions, the novel polymeric thioethers have demonstrated unusual value.

The following examples illustrate the present invention but are not limiting as to the scope thereof. This is particularly notable in respect to the present invention because, of the hundreds of combinations of mercaptans and organic halides of which reaction has been attempted, all have succeeded in preparing the desired thioethers. This has been true even when attempting to prepare highly complex thioethers of hitherto unknown structures and very high molecular weights, using starting reactants especially selected as possibly inoperable. As noted hereinbefore only serious instability or steric hindrance of one or both starting materials, both of which factors can be ascertained in advance, appear to limit the operability of the present invention. Hence, the following examples are illustrative only.

EXAMPLE 1

*Preparation of 2,5-bis(ethylthio)thiophene*

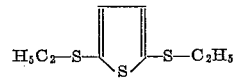

A mixture of 242 grams (1 mole) 2-5-dibromothiophene, 185 grams (2.2 mole) sodium ethylmercaptide, 28.6 grams (0.2 mole) cuprous bromide and 500 milliliters technical 2,4-lutidine was stirred and heated under reflux for 40 hours. The lutidine served both as liquid reaction medium and as nitrogenous base. Upon the completion of the said heating and stirring, the mixture was poured into flaked ice in 500 milliliters concentrated hydrochloric acid. The resulting mixture was then extracted with ether, the resulting ether solution removed and washed once with 10 percent hydrochloric acid and thereafter dried over anhydrous potassium carbonate. The ether solvent was then vaporized and removed, leaving an oily 2,5-bis(ethylthio)thiophene product which was subsequently further purified by distillation in vacuum to obtain 105 grams, a yield of 50 percent by weight of starting thiophene or mercaptide compound, of a colorless liquid boiling at 119–121° C. under 3 millimeters pressure.

EXAMPLE 2

In procedures generally similar to the foregoing, employing a molecular amount of 1,2,4-tribromobenzene, and sodium ethylmercaptide in 3 times the molecular equivalent amount with the bromobenzene compound together with a catalytic amount of cuprous bromide in 2,4-lutidine as both liquid reaction medium and nitrogenous base, there was prepared 1,2,4-tris(ethylthio)benzene. The compound is a yellow liquid boiling at 144–146° C. under 0.6 millimeter mercury pressure.

EXAMPLE 3

*1,2,4,5-tetrakis(ethylthio)benzene*

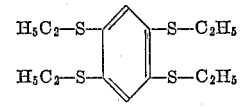

A mixture was prepared consisting of 56.5 grams (0.144 mole) of 1,2,4,5-tetrabromobenzene, 60 grams (0.7 mole) of sodium ethylmercaptide, 10 grams (0.07 mole) of cuprous bromide and 280 milliliters technical 2,4-lutidine. The resulting mixture was heated with stirring under reflux for 44 hours to carry out a reaction and prepare 1,2,4,5-tetrakis(ethylthio)benzene. Upon completion of the reaction, the resulting mixture was then poured into 300 milliliters of concentrated hydrochloric acid with which was mixed a generous amount of ice. As a result of this operation a solid separated from the liquid resulting from the melting of the ice in the acid; the said solid was collected by filtration. The solid was exhaustively extracted with ether, the resulting ether solution gently warmed to evaporate and remove ether solvent and obtain 42 grams, 91 percent by weight of starting materials, of 1,2,4,5-tetrakis(ethylthio)benzene. The compound was further purified by recrystallization from ethanol whereupon it appeared as white crystals melting at 66.5–68.5° C.

A similar product is obtained from the use of ethyl mercaptan: however, because of its volatility, and because the alkali metal salt gives good results, the use of the free mercaptan is not preferred.

EXAMPLE 4

*2-(dodecylthio)thiazole*

A mixture was prepared consisting of 8 grams cuprous oxide, 22 grams dodecanethiol (dodecyl mercaptan), 16.4 grams 2-bromothiazole, 80 milliliters quinoline and 20 milliliters technical 2,4-lutidine. The said quinoline-lutidine mixture was employed because the pot temperature of the boiling mixture was advantageous in carrying out the present reaction. The resulting mixture was heated with stirring under reflux and under a nitrogen atmosphere, with a water separator. The water of reaction of cuprous oxide was thus removed and the removed quantity noted. After the theoretical amount of water had separated, the resulting mixture was stirred and heated under reflux for 3 hours. Thereupon, the mixture was cooled to approximately 100° C. whereupon steam was introduced below the surface of the resulting mixture and quinoline and lutidine azeotropically removed. As a result of these procedures there was obtained a black and tarry residue containing a high proportion of the desired 2-(dodecylthio)thiazole product. The said residue was taken up in chloroform, the chloroform solution filtered, and to the filtrate was added a finely divided, highly activated carbon decolorizing agent. The resulting decolorized solution was thereafter again filtered to remove carbon and sorbed impurities and the resulting filtrate dried over anhydrous potassium carbonate. The resulting dried chloroform solution was then gently warmed to vaporize and remove solvent and obtain an oily 2-(dodecylthio)thiazole as a crude product. The said crude product was distilled and again distilled under subatmospheric pressure to obtain 13.8 grams of highly purified yellow oily 2-(dodecylthio)thiazole product boiling at 140° C. under 0.3 millimeter mercury pressure. The yield was 48.5 percent of theoretical based upon starting materials.

EXAMPLE 5

*1,4-bis(dodecylthio)benzene*

A mixture was prepared consisting of 14.5 grams of cuprous oxide, 41 grams of n-dodecanethiol, 23.6 grams of p-dibromobenzene, 120 milliliters 2,4-lutidine and 60 milliliters quinoline. The resulting mixture was blanketed with nitrogen and thereafter heated and stirred to carry forward an initial reaction in the preparation of desired product. Water of reaction was removed as a vapor and caught in a water trap wherein the amount of water removed was ascertained. Upon formation of the theoretical amount of water, the resulting mixture was heated and stirred under reflux for 6 hours. The hot mixture was then poured into 180 milliliters of concentrated hydrochloric acid containing a relatively large amount of ice. As a result of these procedures there was formed a brown solid which precipitated in the liquid resulting from the melting of the ice in the acid. The said brown solid was allowed to stand for 3 hours and thereafter collected by filtration. The residue from the filtration was then taken up in chloroform and filtered. The resulting chloroform solution was washed twice with 2-normal hydrochloric acid, subsequently washed once with water, and thereafter gently warmed in vacuum to vaporize and remove chloroform solvent. As a result of these operations there was obtained a light-colored 1,4-bis(dodecylthio)benzene product which was recrystallized twice from ethanol to obtain a relatively pure compound in the form of crystalline white plates melting at 78–79.5° C. The yield following the second recrystallization was 21.9 grams, 45.7 percent of theoretical based upon the employed dibromobenzene and dodecanethiol starting materials.

EXAMPLE 6

In manner essentially similar to the foregoing examples, one molecular proportion of hexabromobenzene is dispersed in a mixture of quinoline and pyridine in the presence of a small, catalytic amount (about 5 molecular proportions) of cuprous chloride. To the resulting mixture is added 6 molecular proportions of p-chlorobenzenethiol and the resulting reaction mixture is heated for a period of approximately 3 hours at a temperature of about 180° C. The resulting product is dissolved in chloroform and recrystallized therefrom to obtain, in nearly quantitative yield, a yellow, crystalline hexakis(p-chlorophenylthio)benzene corresponding to the structure

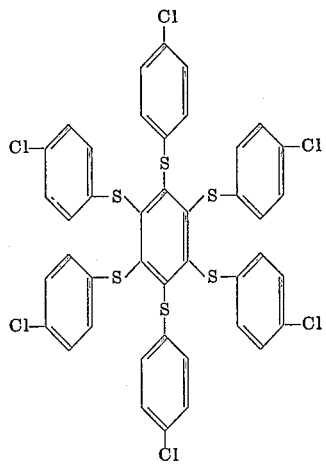

and melting in the temperature range of 71–74° C.

Illustrative of the extreme versatility of the present method, the hexakis(p-chlorophenylthio)benzene compound is employed as starting material in a further preparation wherein it is caused to react with either p-tert-butylbenzenethiol or the alkali metal salt thereof, under the conditions stated, to obtain a hexakis[p-(p-tert-butylphenylthio)phenylthio]benzene product as a difficultly soluble yellow powder.

The compounds of the present invention are useful in various ways. Those of greater molecular weight have value as oil additives to improve the lubricity of high-temperature, high-pressure lubricating oils. Those of low and intermediate molecular weight have value as the active toxicants in insecticidal preparations; some are herbicidal, and the compounds are of particular value as the intermediate substances to be employed with phosphate substances in the preparation of organic phosphate compounds which compounds have been shown to be remarkably effective as pesticides. Various of the compounds prepared according to the present invention offer the only practicable intermediate substances en route to numerous desired organic phosphate compounds and their various thio-analogues.

I claim:

1. A method for the synthesis of thioethers which comprises causing a reaction between a member of the group consisting of a mercaptan and an alkali metal salt of a mercaptan, and an organic halide in the presence, simultaneously, of both a nitrogenous base and a source of cuprous ion.

2. Method of claim 1 wherein the reaction is carried out at a temperature in the range of from about 60° C. to about 250° C.

3. Method of claim 1 wherein the nitrogenous base is a solvent liquid.

References Cited by the Examiner

UNITED STATES PATENTS

| | | | |
|---|---|---|---|
| 2,685,588 | 8/54 | Goshorn et al. | 260—302 |
| 2,744,908 | 5/56 | Young | 260—302 |
| 2,748,145 | 5/56 | Muetterlies | 260—329 |
| 2,903,484 | 9/59 | Hardy et al. | 260—609 |
| 2,908,716 | 10/59 | Cisney et al. | 260—609 |
| 2,922,821 | 1/60 | Kundiger et al. | 260—609 |
| 2,938,928 | 5/60 | Stevenson et al. | 260—609 |
| 3,068,241 | 12/62 | Sargent | 260—329 |

NICHOLAS S. RIZZO, *Primary Examiner.*